United States Patent [19]

Roberts et al.

[11] 4,296,789

[45] Oct. 27, 1981

[54] TREAD FOR PNEUMATIC TIRE

[75] Inventors: Charles W. Roberts, Akron; Michael A. Kolowski, Tallmadge; Daniel J. Lindner, North Canton; John E. Lynch, Bedford; Terrence M. Ruip, Akron, all of Ohio; Harold D. Fetty, Birmingham, Mich.

[73] Assignee: The Goodyear Tire & Rubber Company, Akron, Ohio

[21] Appl. No.: 215,208

[22] Filed: Dec. 11, 1980

Related U.S. Application Data

[63] Continuation of Ser. No. 877,790, Feb. 14, 1978, abandoned.

[51] Int. Cl.³ .............................................. B60C 11/10
[52] U.S. Cl. ................................................ 152/209 R
[58] Field of Search ........................ 152/209 R, 209 D; D12/140, 141, 146, 136, 137

[56] References Cited

U.S. PATENT DOCUMENTS

| | | | |
|---|---|---|---|
| D. 189,013 | 10/1960 | Newman | 152/209 D |
| 3,698,462 | 10/1972 | Jacobs | 152/209 R |
| 3,707,177 | 12/1972 | Boileau | 152/209 R |
| 3,998,256 | 12/1976 | Verdier | 152/209 R |
| 4,055,209 | 10/1977 | Senger | 152/209 R |
| 4,230,512 | 10/1980 | Makino et al. | 152/209 R |

Primary Examiner—Michael W. Ball
Attorney, Agent, or Firm—Frank Pincelli

[57] ABSTRACT

A tread for a pneumatic tire having a plurality of circumferentially spaced independent projections. The tread has three narrow zones which extend circumferentially about the tire; a central zone and two shoulder zones. The depth of the recesses in between the independent projections in these zones is substantially less than the depth of the recesses in between the projections in the remaining portion of the tread.

8 Claims, 2 Drawing Figures

TREAD FOR PNEUMATIC TIRE

This is a continuation of application Ser. No. 877,790, filed Feb. 14, 1978, now abandoned.

The foregoing abstract is not to be taken as limiting the invention of this application, and in order to understand the full nature and extent of the technical nature of this application, reference must be made to the accompanying drawings and the following detailed description.

BACKGROUND OF THE INVENTION

This invention relates to pneumatic tires, and more particularly, to an improved tread for tires. It is well known in the tire industry that the choice of a particular tread involves trade-off between specific tire performance characteristics in order to achieve the overall desired tire performance. Among such characteristics are those directed to wear, comfort, noise, handling under various road conditions, fuel consumption and the like. The foregoing performance characteristics are quite often at odds with each other for any given tread design. For example, a tread which has good wet traction or good snow traction is generally obtained at the expense of dry traction, handling, tread wear and/or noise production; a tread which has good tread wear is generally obtained at the expense of wet traction, ride, snow traction and/or comfort; a tread which has good fuel consumption is generally obtained at the expense of wear and/or traction. Due to the complex interaction between these performance characteristics it is difficult to obtain a tread which can exhibit good wet and snow traction characteristics while still maintaining good tread wear, dry traction, handling and low noise levels.

Applicants have discovered a particular arrangement by which good wet traction may be obtained while still maintaining good tread wear, dry traction, handling and noise level.

SUMMARY OF THE INVENTION

A tire made in accordance with the present invention is provided with a plurality of spaced independent buttons or projections placed circumferentially about the tire. The tread has three relatively narrow zones with respect to the width of the tread which extend circumferentially about the tire. The depth of the recesses in between the buttons or projections in these zones is less than the depth of the recesses in the remaining portion of the tread.

DESCRIPTION OF THE PREFERRED EMBODIMENT

Figure 1:
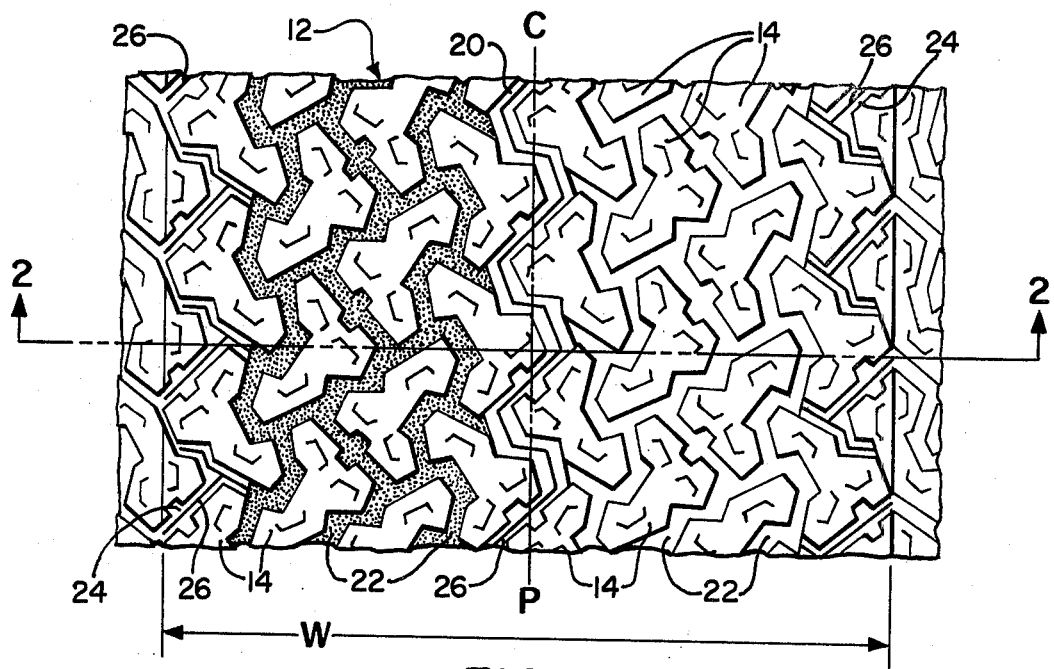
FIG. 1 is a fragmentary plan view of a tread of a tire made in accordance with the present invention.
Figure 2:
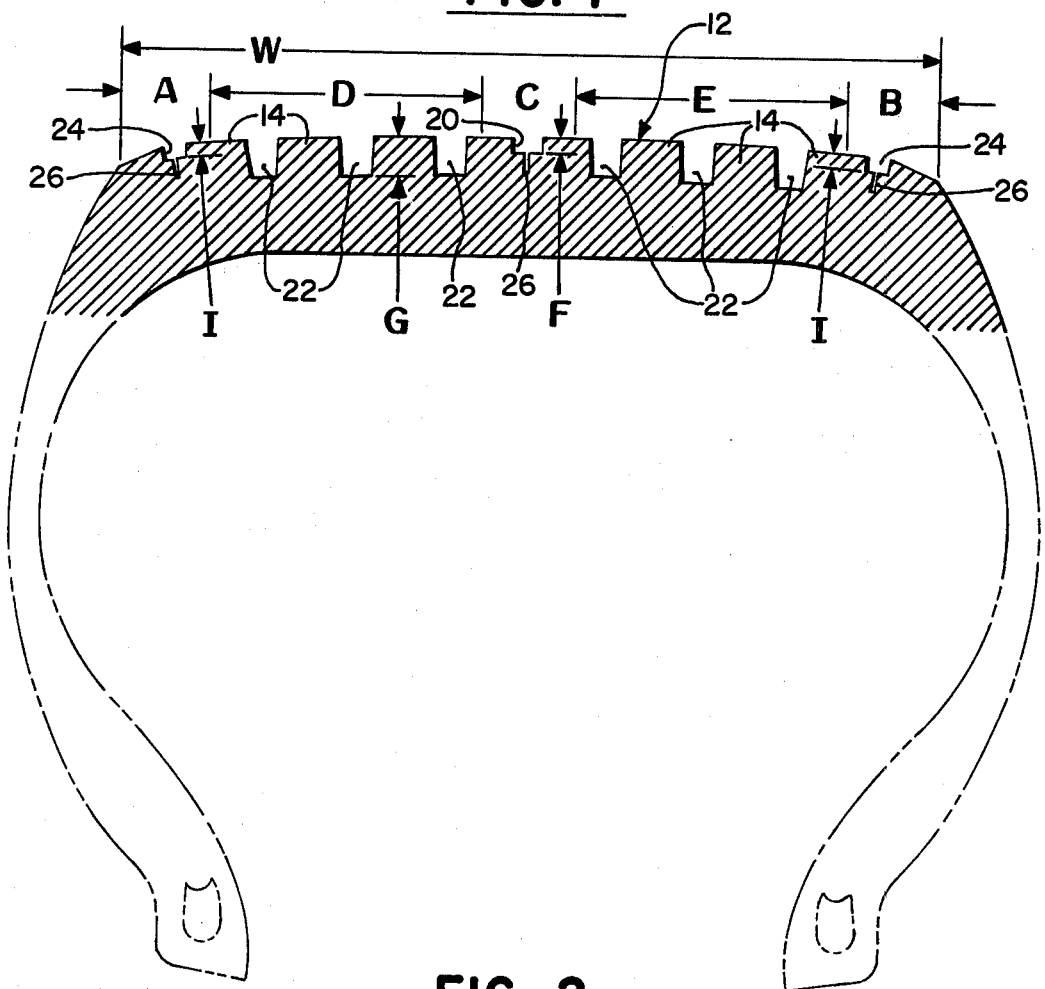
FIG. 2 is a cross-sectional view of a tread made in accordance with the present invention taken along line 2—2 of FIG. 1.

Referring to FIG. 1 there is illustrated a fragmentary plan view of a tread 12 made in accordance with the present invention. It is to be understood that the tread continues in like manner circumferentially about the tire. The tread 12 comprises of a plurality of independent buttons or projections 14. For the purpose of this invention independent projections shall be considered projections which have a length substantially less than the length of the footprint at design inflation pressures and at rated load, preferably less than 50%. In the embodiment illustrated, the projections 14 have an outer configuration which is basically triangular in configuration as viewed in a plane perpendicular to the tread; however, any desired configuration may be used. In order to obtain good wet traction, there should be sufficient void area in the tread so that water may be channeled into these void areas instead of creating a hydrostatic pressure which would exert a lifting force against the tire. The use of independently spaced projections and a low net to gross in the tread allows water to freely escape from the footprint of the tire. For the purposes of this invention, the footprint of the tire is that portion of the tread which comes in contact with the road surface.

Unfortunately, the use of independent projections and a low net to gross in the tread of a tire generally detracts from handling, dry traction, and increases noise production. In order to overcome these disadvantages, the tread 12 is provided with three circumferentially extending zones in which the recesses in between the projections 14 are substantially less than the recesses in between the projections 14 in the remaining portion of the tread 12. The tread 12 is provided with a central zone C and two shoulder zones A, B, respectively, in which the depth of the recesses in between the projections 14 is less than the depth of the recesses in the remaining portions D and E of the tread 12. The full depth recesses provide the necessary void area between the independent projections for good wet traction while the reduced recess depth portions A and B provide the stiffening necessary between the projections for good tread wear, handling, and noise levels. Additionally, tread 12 is provided with a low net to gross tread. For purposes of this invention net to gross shall be defined as the net contact area of tread with the road as a percentage of the total contact area. The tread 12 should have a net to gross of less than 65%, preferably between 65% and 50%.

The full depth recesses are located in that portion of the tread wherein the unit pressure is lower than the adjacent area, thus allowing the water to be channeled into these voids rather than creating the hydrostatic pressure which would exert a lifting force against the tread 12. Accordingly, the reduced recess depths are located in the portion of the tread 12 between the projections wherein the unit pressure is high. The unit pressure exerted on a tire in the footprint thereof varies axially across the tread 12; this variation being more pronounced in passenger tires. The unit pressure is greatest at the lateral edges of the tread and decreases to a low somewhere in between the tread edge and the mid-circumferential centerplane CP of the tire and then gradually increases to a higher unit pressure in the central area of the tread, the highest unit pressures occurring at the lateral edges. A graphical representation of the unit pressure as viewed in a radial cross-sectional plane would be in the shape of a "W", the peaks being at the shoulder areas and at the central area of the tread. The reduced recess depth in zones A,B,C serve to buttress projections 14 and to reduce deformation and squirm which lead to undesirable tread wear and tread noise produced in these areas. Additionally, the increased stiffness in these zones allow the tread 12 to respond more positively to slight straight ahead steering corrections (more commonly referred to in the industry as "on center feel") and to more exaggerated handling maneuvers. The reduced depth recesses further serve to reduce the noise generated in the central portion of the tread.

The central zone C is located approximately in the central portion of the tread 12 and extends circumferentially about the tire. Preferably, the central zone C is located so that the axial edges are spaced equidistant from the mid-circumferential plane CP of the tire. The width of the central zone A may range from 5% to 20%; preferably, 15% of the width W of the tread 12. For the purposes of this invention the width W of the tread shall be defined as the axial distance between the edges of the tread as determined from the footprint of the tire mounted on a wheel and loaded to design specification. The depth F of the recesses 20 in the central zone C is between 25% and 60% of the depth G of the recesses 22 in zones D and E, preferably about 35%.

The shoulder zones extend axially inward from the tread edges toward the mid-circumferential plane CP of the tire and extend circumferentially about the tire. The width of each shoulder zone is equal to approximately 10% to 20% of the tread width W, preferably 15%. The depth I of the recesses 24 in zones A, B is equal to approximately 25% to 60% of the depth of the recesses 22 in zones D and E, preferably 40%.

The total width of the three zones A, B, C preferably does not exceed 60% of the width W of the tread 12.

The bottom of the reduced recesses 20 and 24 in zones A, B, C may be further provided with blading 26 for continued acceptable traction as the surface of the projections 14 wear to the bottom of the recesses in these zones.

While certain representative embodiments and details have been shown for purposes of illustrating the invention, it will be apparent to those skilled in this art that various changes and modifications may be made therein without departing from the spirit or scope of the invention.

We claim:

1. A pneumatic tire having a ground-engaging tread portion, said tread portion consisting of a plurality of independent buttons or projections placed circumferentially about said tire, said independent buttons or projections being spaced apart so as to provide a plurality of grooves adjacent the periphery of said buttons or projections, said grooves being sufficiently wide so as not to close up at the ground contacting surface when in the footprint of the tire, said tire characterized in that said tread is provided with a central zone and two shoulder zones which extend circumferentially about said tire, the width of said central zone and each of said shoulder zones being substantially less than the width of said tread, said central zone being located such that the longitudinal axial edges of said zone are spaced equidistant from the mid-circumferential plane of said tire, said central zone having a width ranging from 5% to 20% of the width of the tread of said tire and the depth of the recesses in between said projections in said central zone being between 25% and 60% of the depth of the recesses in between said projection in said remaining portion in between said central zone and said shoulder zones, said shoulder zones are spaced from and located axially outward from said central zone, one on either side of said central zone, and extend from each tread edge toward the mid-circumferential plane of said tire, said shoulder zones having a width from about 5% to 20% of the width of said tread of said tire and the recesses in between said projections in said shoulder zone being from about 25% to 60% of the depth of the recesses in between said projection in said remaining portion in between said central zone and said shoulder zone.

2. A pneumatic tire according to claim 1 wherein the width of said central zone is about 15% the width of said tread.

3. A pneumatic tire according to claim 1 wherein the depth of said recesses in said central zone is about 35% of the depth of said recesses in between said projections in said remaining portions in between said central zone and said shoulder zones.

4. A pneumatic tire according to claim 1 wherein the width of each shoulder zone is equal to approximately 15% of the width of said tread.

5. A pneumatic tire according to claim 1 wherein the depth of said recesses in said shoulder zones is equal to approximately 40% the depth of the recesses in said portion in between said central zone and shoulder zones.

6. A pneumatic tire according to claim 1 wherein the bottom of said recesses in said central and shoulder zones is further provided with blading.

7. A pneumatic tire according to claim 1 wherein the tread portion of the tire has a net to gross not greater than 60%.

8. A pneumatic tire having a ground-engaging tread portion, said tread portion consisting of a plurality of independent buttons or projections placed circumferentially about said tire, said independent buttons or projections being spaced apart so as to provide a plurality of grooves adjacent the periphery of said buttons or projections, said grooves being sufficiently wide so as to not close up at the ground contacting surface when in the footprint of the tire, said tire characterized in that said tread is provided with a central zone and two shoulder zones which extend circumferentially about said tire, the width of said central zone and each of said shoulder zones being substantially less than the width of said tread, said central zone being located such that the longitudinal axial edges of said zone are spaced substantially equidistant from the mid-circumferential plane of said tire, said central zone having a width ranging from 5% to 20% of the width of the tread of said tire and the depth of the recesses in between said projections in said central zone being between 25% and 60% of the depth of the recesses in between said projection in said remaining portion in between said central zone and said shoulder zones, said shoulder zones are spaced from and located axially outward from said central zone, one on either side of said central zone, and extend from each tread edge toward the mid-circumferential plane of said tire, said shoulder zones having a width from about 5% to 20% of the width of said tread of said tire and the recesses in between said projections in said shoulder zone being from about 25% to 60% of the depth of the recesses in between said projection in said remaining portion in between said central zone and said shoulder zone, to total combined width of said central zone and said shoulder zones being not greater than 60% of the width of said tread, said tread having a net to gross not greater than 65%.

* * * * *